United States Patent
Ito et al.

(10) Patent No.: US 10,717,346 B2
(45) Date of Patent: Jul. 21, 2020

(54) AIR-CONDITIONING REGISTER

(71) Applicant: TOYODA GOSEI CO., LTD., Kiyosu-shi, Aichi-ken (JP)

(72) Inventors: Kenichi Ito, Kiyosu (JP); Masaki Otake, Kiyosu (JP); Yasuyuki Mitsui, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 72 days.

(21) Appl. No.: 16/038,311

(22) Filed: Jul. 18, 2018

(65) Prior Publication Data
US 2019/0061475 A1  Feb. 28, 2019

(30) Foreign Application Priority Data
Aug. 25, 2017 (JP) .................. 2017-162141

(51) Int. Cl.
*B60H 1/34* (2006.01)

(52) U.S. Cl.
CPC ... *B60H 1/3421* (2013.01); *B60H 2001/3464* (2013.01)

(58) Field of Classification Search
CPC ............ B60H 1/3421; B60H 2001/3464
USPC ....................................... 454/155
See application file for complete search history.

(56) References Cited

U.S. PATENT DOCUMENTS

| 2003/0157880 A1* | 8/2003 | Nishida .............. B60H 1/3414 454/155 |
| 2006/0040606 A1* | 2/2006 | Park ................... B60H 1/3428 454/155 |
| 2008/0119124 A1* | 5/2008 | Okuno ............... B60H 1/3428 454/69 |
| 2016/0313025 A1 | 10/2016 | Nemoto |

FOREIGN PATENT DOCUMENTS

| JP | 2013-023082 A | 2/2013 |
| JP | 2016-159845 A | 9/2016 |

* cited by examiner

*Primary Examiner* — Helena Kosanovic
(74) *Attorney, Agent, or Firm* — Posz Law Group, PLC

(57) ABSTRACT

An air-conditioning register includes a tubular retainer including a wall and a downstream opening, fins that are located adjacent to the downstream opening in the retainer and arranged parallel to one another so as to be tiltable relative to the retainer, and an operation knob mounted to a central fin. Each of the fins includes two rotation shafts at opposite ends of the fin. The wall of the retainer includes bearing holes, each supporting one of the rotation shafts of the corresponding fin. The overlap between the rotation shaft of one of the fins that is free of the knob and the inner surface defining the corresponding bearing hole is smaller than the overlap between the rotation shaft of the fin to which the knob is mounted and the inner surface defining the corresponding bearing hole.

4 Claims, 7 Drawing Sheets

AIR-CONDITIONING REGISTER

BACKGROUND

The present invention relates to an air-conditioning register that changes the direction of the air sent from an air-conditioning system and blows it into a passenger compartment through a vent.

Japanese Laid-Open Patent Publication No. 2016-159845 discloses an air-conditioning register that includes a tubular retainer defining an air passage, a plurality of downstream fins located adjacent to the downstream opening in the retainer and arranged parallel to one another such that the downstream fins are tiltable relative to the retainer, and a plurality of upstream fins located upstream of the downstream fins and arranged parallel to one another such that the upstream fins are tiltable relative to the retainer.

The plurality of downstream fins includes a main fin and two sub-fins arranged above and below the main fin. The main fin and sub-fins each have the shape of an elongated plate extending in the vehicle width direction. An operation knob is mounted to the main fin.

Each downstream fin includes two rotation shafts, which are located at the opposite ends of the downstream fin. One of the vertical walls of the retainer includes three bearing holes, each supporting one of the rotation shafts of the corresponding downstream fin. The other vertical wall of the retainer includes a recess, to which a shim (bearing member) is coupled. The shim includes three bearing holes, each supporting the other rotation shaft of the corresponding downstream fin.

Conventionally, to couple the downstream fins to the retainer, one of the rotation shafts of each downstream fin is first inserted into the bearing hole of the shim, so that the downstream fins are integrated with the shim. Then, the downstream fins are tilted relative to the extension direction of the retainer, and the other rotation shaft of each tilted downstream fin is inserted into the corresponding bearing hole in the vertical wall of the retainer. The shim is then pressed into the recess in the vertical wall of the retainer and thus coupled to the retainer. That is, the downstream fins and the shim, which are integrated with one another, are rotated while being coupled to the retainer.

SUMMARY

As described above, a conventional air-conditioning register requires the combination of the downstream fins and the shim to be rotated while being coupled to the retainer. This increases the assembly time, leaving room for improvement.

Alternatively, the downstream fins can be coupled to the retainer along the extension direction of the retainer, that is, coupled in a straight manner, by inserting the rotation shafts of the downstream fins into the bearing holes while deforming the vertical wall of the retainer. With the conventional air-conditioning register, however, such deformation of the vertical wall often compromises the roundness of the bearing holes. This may increase the sliding resistance between the bearing holes and the rotation shafts. As a result, a greater force is required to tilt the downstream fins, degrading the operation feeling.

It is an objective of the present invention to provide an air-conditioning register that allows fins to be coupled along the extension direction of the retainer in an improved manner.

An air-conditioning register of one embodiment according to the present invention includes: a tubular retainer defining an air passage and including a wall and a downstream opening; a plurality of fins located adjacent to the downstream opening in the retainer, the fins being arranged parallel to one another and tiltable relative to the retainer; and an operation knob mounted to one of the fins that is located at the center in the arrangement direction of the plurality of fins. Each of the fins includes two rotation shafts, which are located at the opposite ends of the fin. The wall of the retainer includes a plurality of bearing holes, each supporting one of the rotation shafts of the corresponding one of the fins. The overlap between the rotation shaft of one of the fins that is free of the operation knob and the inner surface defining the corresponding one of the bearing holes is smaller than the overlap between the rotation shaft of the fin to which the operation knob is mounted and the inner surface defining the corresponding one of the bearing holes.

Other aspects and advantages of the present invention will become apparent from the following description, taken in conjunction with the accompanying drawings, illustrating by way of example the principles of the invention.

DETAILED DESCRIPTION OF THE PREFERRED EMBODIMENTS

Figure 7:
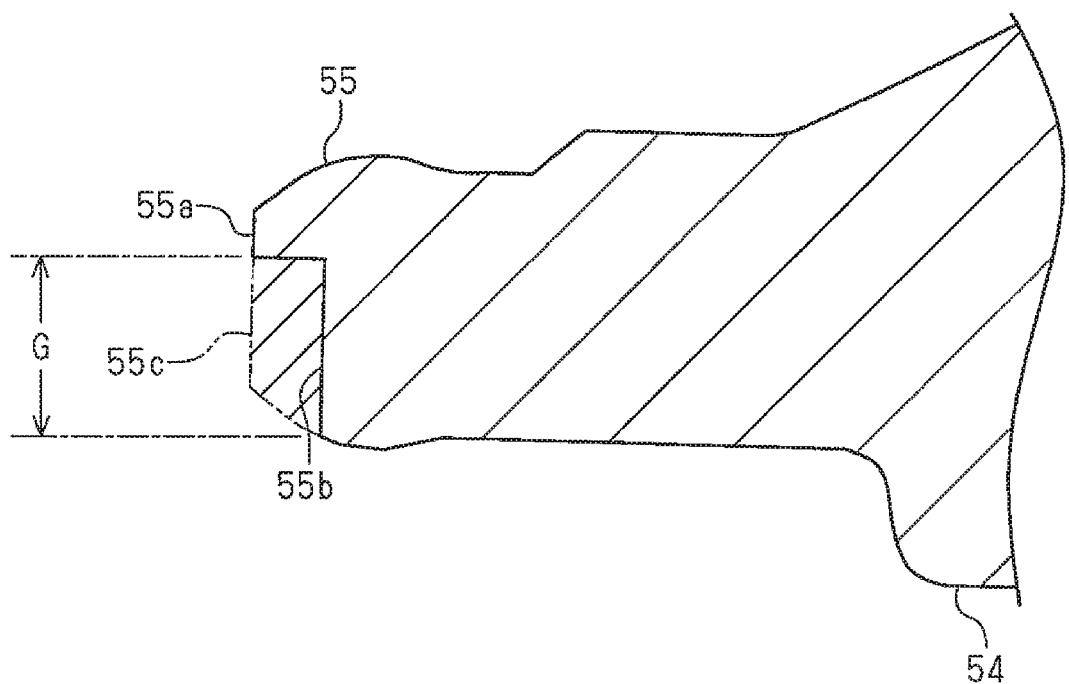
FIG. 7 is an enlarged cross-sectional view of a rotation shaft of a downstream fin shown in FIG. 1.

Referring to FIGS. 9 to 7, one embodiment is now described.

Figure 1:
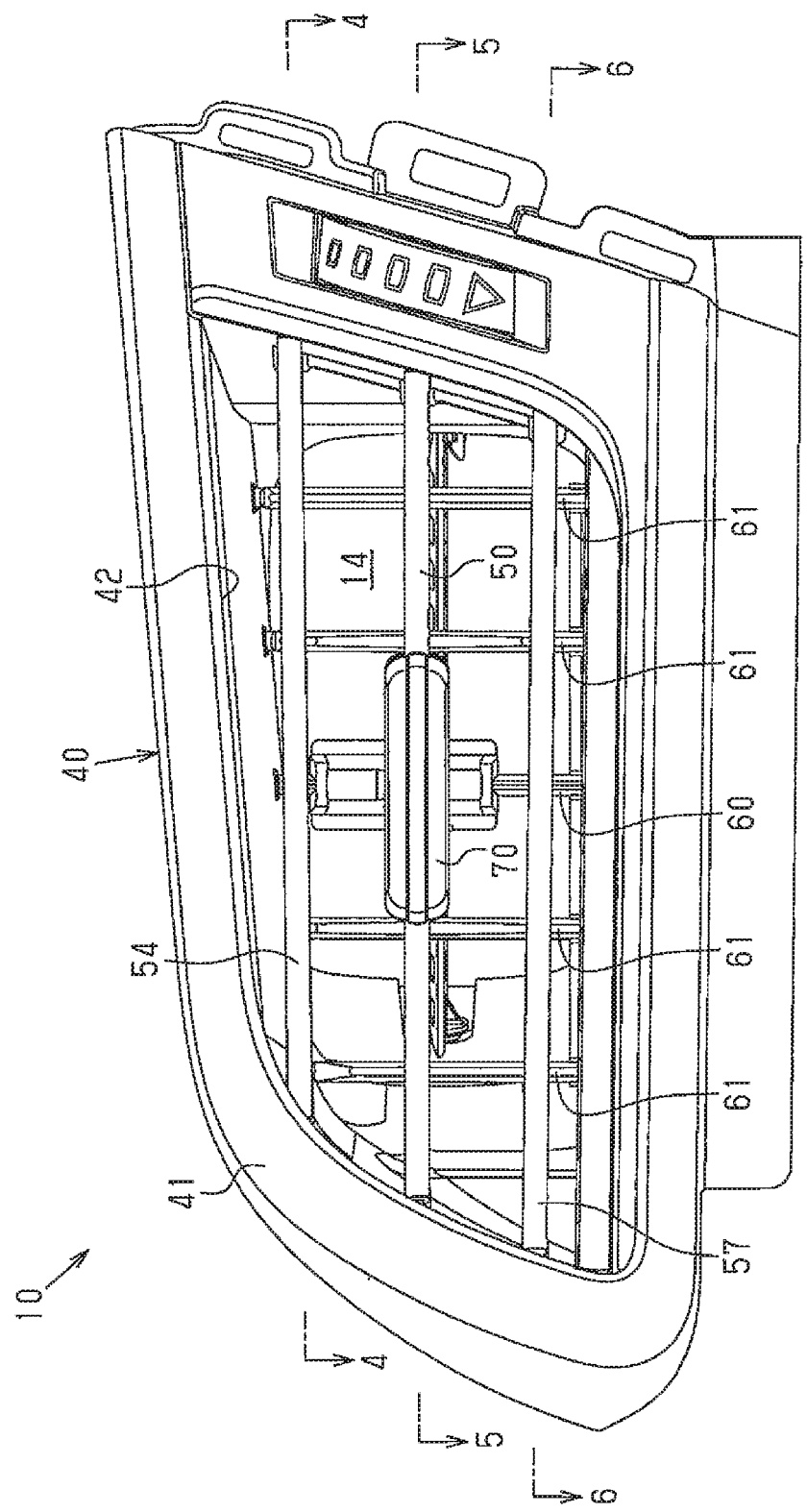
FIG. 1 is a front view showing an air-conditioning register of one embodiment.
Figure 2:
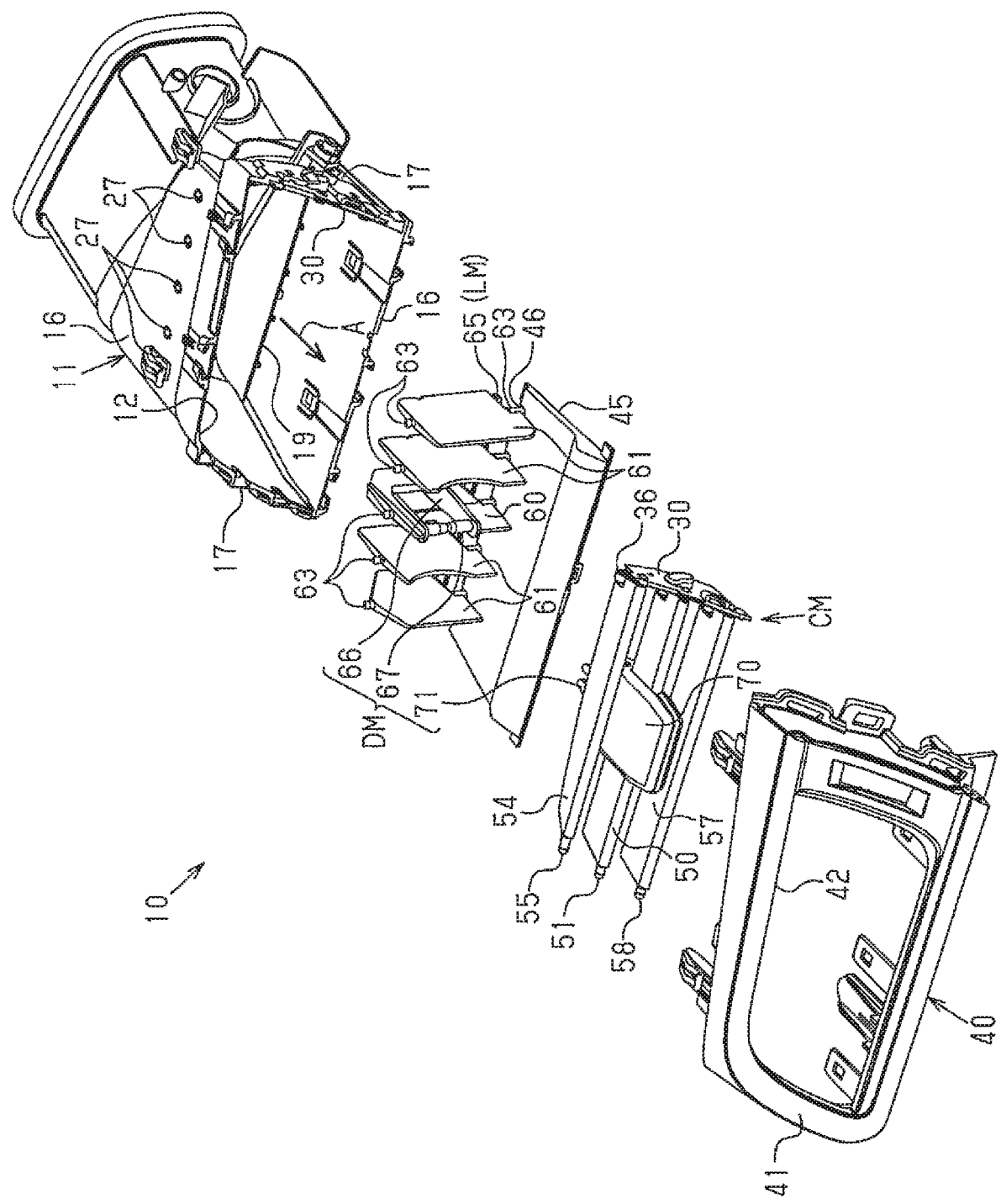
FIG. 2 is an exploded perspective view of the air-conditioning register of FIG. 1.

As shown in FIGS. 1 and 2, an air-conditioning register 10, which is to be installed into an instrument panel of a vehicle, includes a retainer 11, a bezel 40, a plurality of downstream fins 50, 54 and 57, an interlock mechanism CM, a plurality of upstream fins 60 and 61, an operation knob 70, a transmission mechanism DM, and a link mechanism LM.

The components of the air-conditioning register 10 are configured as follows.

<Retainer 11>

Figure 3:
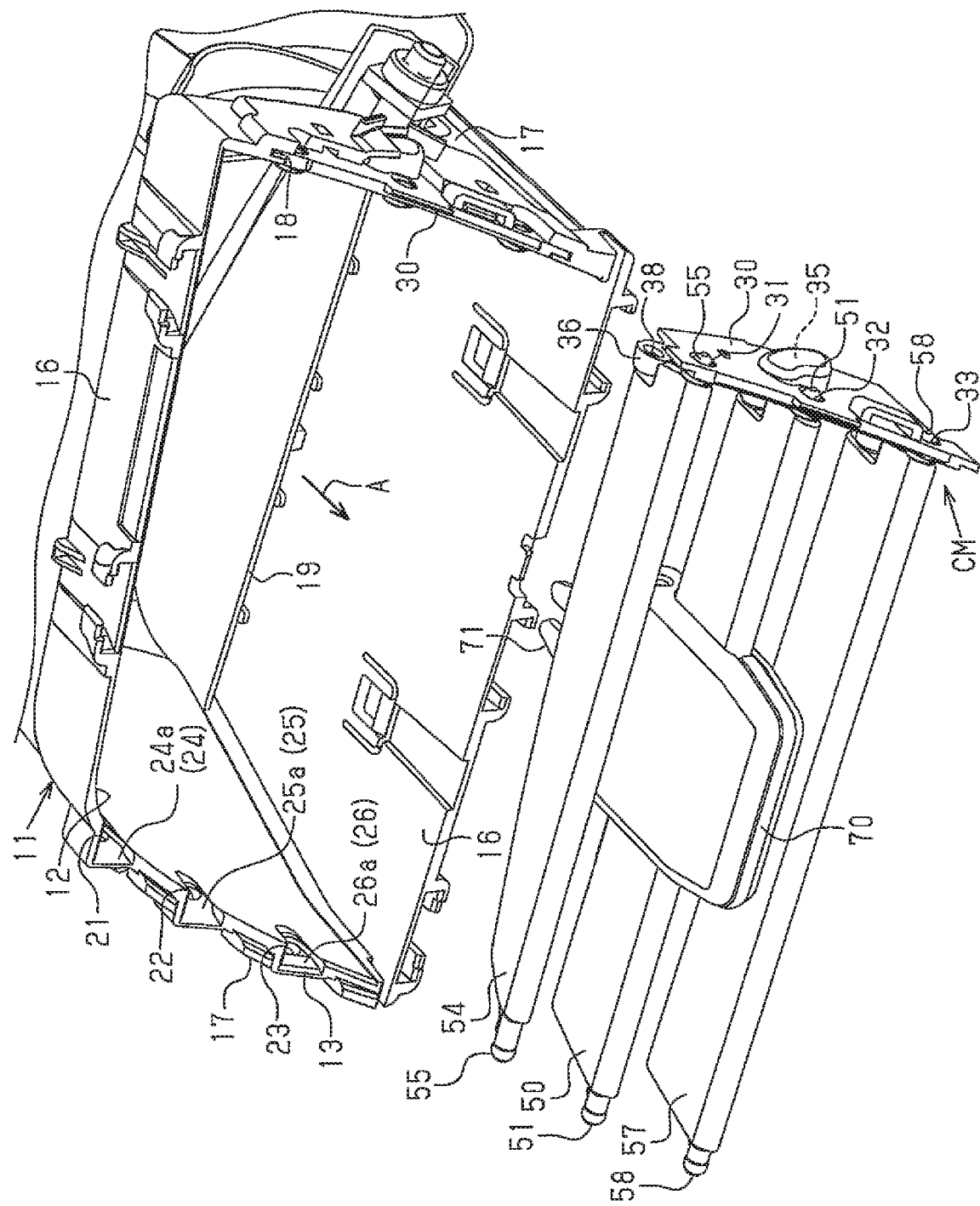
FIG. 3 is an enlarged view of some of the components shown in FIG. 2.

As shown in FIGS. 2 and 3, the retainer 11 substantially has the shape of a rectangular tube extending in the front-rear direction of the vehicle and having open front and rear ends. The dimension in the vehicle width direction of the retainer 11 is greater than the dimension in the up-down direction. The internal space of the retainer 11 forms a flow path (hereinafter referred to as an air passage 14) of the air A sent from an air-conditioning system. The retainer 11 is made of a hard plastic material such as polypropylene.

In the following descriptions, the upstream side and the downstream side in the flow direction of the air A flowing in the retainer 11 may be simply referred to as "upstream side" and "downstream side".

The retainer 11 has four walls 16 and 17 surrounding the air passage 14. Of the four walls, two are lateral walls 16, which face each other in the up-down direction, and the other two are vertical walls 17, which face each other in the vehicle width direction.

As shown in FIG. 3, a section of the vertical wall 17 on one side (the left side as viewed in FIG. 3) that is adjacent to the downstream opening 12 includes a first bearing hole 21, a second bearing hole 22, and a third bearing hole 23, which are arranged in this order from top to bottom and spaced apart from one another.

The vertical wall 17 on the other side (the right side as viewed in FIG. 3) includes a recess 18, which is continuous with the downstream opening 12. The recess 18 receives a planar first shim 30 extending in the up-down direction. The first shim 30 is fitted into the recess 18 from the downstream side. As shown in FIGS. 2 and 3, the first shim 30 is coupled to the recess 18 of the retainer 11. The first shim 30 is shown duplicated in FIGS. 2 and 3 for illustrative purpose. The first shim 30 includes a first bearing hole 31, a second bearing hole 32, and a third bearing hole 33, which are arranged in this order from top to bottom and spaced apart from one another. The first shim 30 is made of an elastomer material.

As shown FIG. 2, a section of the upper lateral wall 16 of the retainer 11 that is upstream of the bearing holes 21, 22 and 23 includes bearing sections 27, which are spaced apart from one another in the vehicle width direction.

The upper surface of the lower lateral wall 16 of the retainer 11 receives a planar second shim 45, which is fitted from the downstream side. The upstream edge of the second shim 45 includes bearing sections 46, which are spaced apart from one another in the vehicle width direction so that they correspond to the bearing sections 27.

As shown in FIGS. 2 and 3, the upper surface of the lower lateral wall 16 of the retainer 11 includes a contact section 19 extending in the vehicle width direction. The upstream edge of the second shim 45 is in contact with the contact section 19.

<Bezel 40>

As shown in FIGS. 1 and 2, the main part of the bezel 40 is an annular main body 41. The main body 41 includes a vent 42, which has a dimension in the vehicle width direction that is greater than the dimension in the up-down direction. The bezel 40 is located downstream of the retainer 11 in the airflow direction and coupled to the retainer 11.

<Downstream Fins 50, 54 and 57>

As shown in FIGS. 1 to 3, the downstream fins 50, 54 and 57 includes a main fin 50, an upper sub-fin 54 located above the main fin 50, and a lower sub-fin 57 located below the main fin 50.

As shown in FIGS. 2 and 3, the main fin 50 and the sub-fins 54 and 57 each have the shape of an elongated plate having a dimension in the vehicle width direction that is greater than the dimension in the airflow direction. The fins 50, 54 and 57 are spaced apart from one another in the up-down direction.

The main fin 50 has two rotation shafts 51 extending from the opposite end surfaces in the vehicle width direction of the main fin 50. The rotation shafts 51 extend outward in the vehicle width direction. Similarly, the sub-fins 54 and 57 each have two rotation shafts 55 and 58, respectively, extending from the opposite end surfaces in the vehicle width direction of the sub-fins 54 and 57. The rotation shafts 55 and 58 extend outward in the vehicle width direction.

The rotation shafts 51, 55 and 58 are arranged at the downstream ends in the airflow direction of the main fin 50 and the sub-fins 54 and 57.

The main fin 50 and the sub-fins 54 and 57 are made of a hard plastic material, such as polypropylene with glass fiber filler.

Figure 4A:
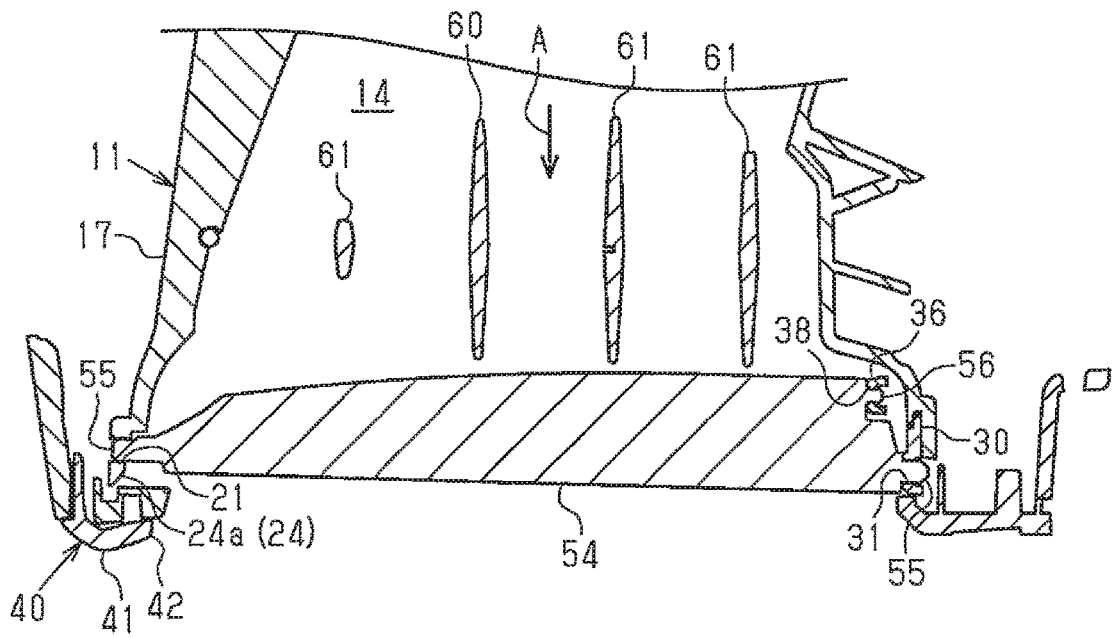
FIG. 4A is a cross-sectional view taken along line 4-4 in FIG. 1.

As shown in FIG. 4A, one of the rotation shafts 55 of the upper sub-fin 54 is rotationally supported by the first bearing hole 21 of the retainer 11. The other rotation shaft 55 of the upper sub-fin 54 is rotationally supported by the first bearing hole 31 of the first shim 30. The upper sub-fin 54 is thus supported so as to be tiltable relative to the retainer 11.

Figure 5A:
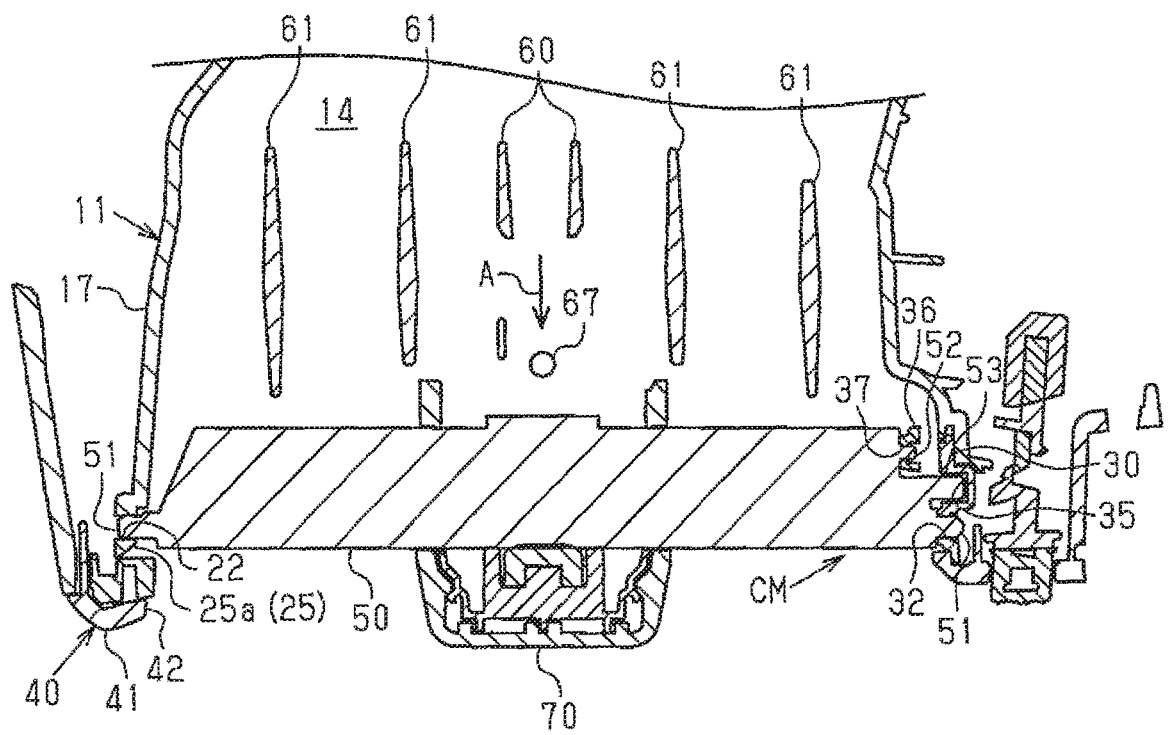
FIG. 5A is a cross-sectional view taken along line 5-5 in FIG. 1.

As shown in FIG. 5A, one of the rotation shafts 51 of the main fin 50 is rotationally supported by the second bearing hole 22 of the retainer 11. The other rotation shaft 51 of the main fin 50 is rotationally supported by the second bearing hole 32 of the first shim 30. The main fin 50 is thus supported so as to be tiltable relative to the retainer 11.

Figure 6:
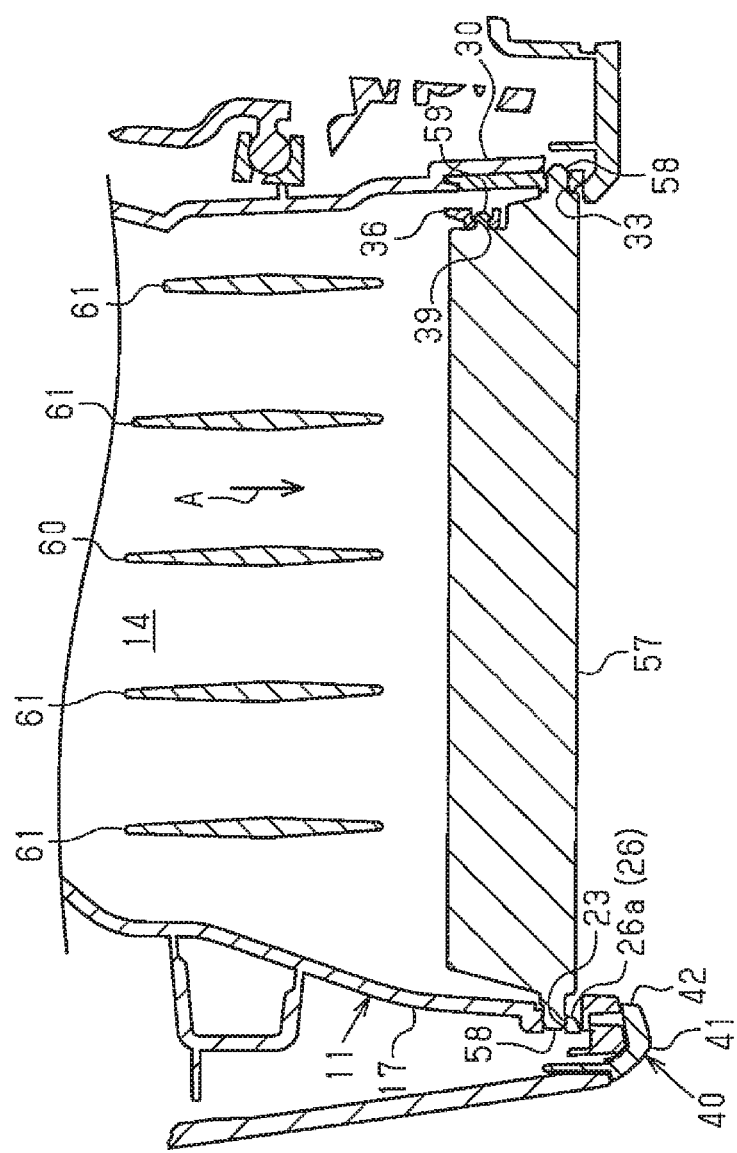
FIG. 6 is a cross-sectional view taken along line 6-6 in FIG. 1.

As shown in FIG. 6, one of the rotation shafts 58 of the lower sub-fin 57 is rotationally supported by the third bearing hole 23 of the retainer 11. The other rotation shaft 58 of the lower sub-fin 57 is rotationally supported by the third bearing hole 33 of the first shim 30. The lower sub-fin 57 is thus supported so as to be tiltable relative to the retainer 11.

In this way, the downstream fins 50, 54 and 57 are disposed adjacent to the downstream opening 12 in the retainer 11 and arranged parallel to one another such that they are tiltable relative to the retainer 11.

<Interlock Mechanism CM>

The interlock mechanism CM transmits tilting of the main fin 50 about the rotation shafts 51 to the sub-fins 54 and 57 such that the sub-fins 54 and 57 are tilted in synchronization with the tilting of the main fin 50 in substantially the same direction as the main fin 50.

As shown in FIG. 4A, the upper sub-fin 54 includes a driving shaft 56 extending in the vehicle width direction from one end surface (the right end surface as viewed in FIG. 4A). The driving shaft 56 is located upstream of the rotation shafts 55 in the airflow direction.

As shown in FIG. 5A, the main fin 50 includes a driving shaft 52 extending in the vehicle width direction from one end surface (the right end surface as viewed in FIG. 5A). The driving shaft 52 is located upstream of the rotation shafts 51 in the airflow direction.

As shown in FIG. 6, the lower sub-fin 57 includes a driving shaft 59 extending in the vehicle width direction from one end surface (the right end surface as viewed in FIG. 6). The driving shaft 59 is located upstream of the rotation shafts 58 in the airflow direction.

As shown in FIGS. 4A, 5A and 6, a coupling member 36, which extends in the up-down direction, is arranged between the fins 50, 54 and 57 and the first shim 30. The driving shafts 52, 56 and 59 are engaged with driving holes 37, 38 and 39 of the coupling member 36. These driving shafts 52, 56 and 59 and the coupling member 36 form the interlock mechanism. CM.

As shown in FIGS. 3 and 5A, a section of the first shim 30 located upstream of the second bearing hole 32 includes an arcuate guide recess 35, which is depressed outward in the vehicle width direction and is convex toward the upstream side.

The main fin 50 includes a stopper shaft 53 extending in the vehicle width direction from one end surface (the right end surface as viewed in FIG. 5A). The stopper shaft 53 is located between the rotation shaft 51 and the driving shaft 52. The stopper shaft 53 is inserted in the guide recess 35 and movable in the guide recess 35.

When the main fin 50 is tilted about the rotation shaft 51, the driving shaft 52 moves about the rotation shaft 51 and the stopper shaft 53 moves in the guide recess 35. The coupling member 36 moves in the up-down direction accordingly.

<Upstream Fins 60 and 61>

As shown in FIG. 2, the plurality of upstream fins 60 and 61 are located upstream of the plurality of downstream fins 50, 54 and 57. The upstream fins 60 and 61, each having the shape of a plate extending in the up-down direction, are spaced apart from one another in the vehicle width direction. The plurality of upstream fins 60 and 61 includes one upstream fin 60, which is at the center in the vehicle width direction, and four other upstream fins 61.

Each of the upstream fins 60 and 61 includes upper and lower rotation shafts 63 extending from the upper and lower surfaces. The rotation shafts 63 are located in the central sections in the airflow direction of the upstream fins 60 and 61. The upper and lower rotation shafts 63 of the upstream fins 60 and 61 are rotationally supported by the bearing sections 27 of the retainer 11 and the bearing sections 46 of the second shim 45. The upstream fins 60 and 61 are thus supported so as to be tiltable relative to the retainer 11.

Each of the upstream fins 60 and 61 includes a coupling shaft (not shown), which extends downward from a section of the lower end surface that is upstream in the airflow direction of the rotation shafts 63. The coupling shafts of the upstream fins 60 and 61 are inserted in holes (not shown) of a coupling rod 65 extending in the vehicle width direction. The coupling rod 65 couples the upstream fins 60 and 61 to one another. The coupling shafts and the coupling rod 65 form the link mechanism LM. The link mechanism LM tilts all the upstream fins 61 other than the center upstream fin 60 in synchronization with the center upstream fin 60 such that the upstream fins 61 are tilted at substantially the same angle as the center upstream fin 60.

<Operation Knob 70 and Transmission Mechanism DM>

The operation knob 70 is operated by an occupant of the vehicle to change the blowing direction of the air A. As shown in FIGS. 1 to 3 and 5A, the operation knob 70 is mounted to the main fin 50, which is located at the center in the arrangement direction of the downstream fins 50, 54 and 57 (the up-down direction). The operation knob 70 sandwiches the main fin 50 from above and below such that the operation knob 70 can slide relative to the main fin 50 in the longitudinal direction of the main fin 50 (the vehicle width direction).

As can be understood from FIG. 2, the transmission mechanism DM transmits the sliding movement of the operation knob 70 to the center upstream fin 60, so that the upstream fin 60 is tilted about the upper and lower rotation shafts 63.

The upstream fin 60 includes a cutout section 66 at the center in the airflow direction. The upstream fin 60 also includes a transmission shaft 67 extending in the up-down direction. The transmission shaft 67 is located in the cutout section 66 and at the downstream end in the airflow direction.

As shown in FIGS. 2 and 3, a bifurcated fork 71 is coupled to the upstream end in the airflow direction of the operation knob 70.

Referring to FIG. 2, the fork 71 sandwiches the transmission shaft 67 of the upstream fin 60 from opposite sides in the vehicle width direction. The cutout section 66 is a space through which the fork 71 passes when the upstream fin 60 is tilted. The other upstream fins 61 do not include a cutout section 66 or a transmission shaft 67.

Sliding of the operation knob 70 in the vehicle width direction applies a force in the sliding direction to the center upstream fin 60 through the fork 71 and the transmission shaft 67, thereby tilting the upstream fin 60 about, the upper and lower rotation shafts 63.

Features of the air-conditioning register 10 of the present embodiment are now described.

<Overlaps R1, R2 and R3 Between Rotation Shafts 51, 55 and 58 of Downstream Fins 50, 54 and 57 and Bearing Holes 21, 22 and 23>

As shown in FIG. 3, sections of the inner surface of the vertical wall 17 of the retainer 11 that are downstream of the bearing holes 21, 22 and 23 include recessed sections 24, 25 and 26, which extend from the downstream end surface 13 of the retainer 11 to the bearing holes 21, 22 and 23.

As shown in FIGS. 3 to 6, the recessed sections 24, 25 and 26 include inclined surfaces 24a, 25a and 26a, respectively, which are inclined such that the upstream sides are located inward in the vehicle width direction.

Figure 4B:
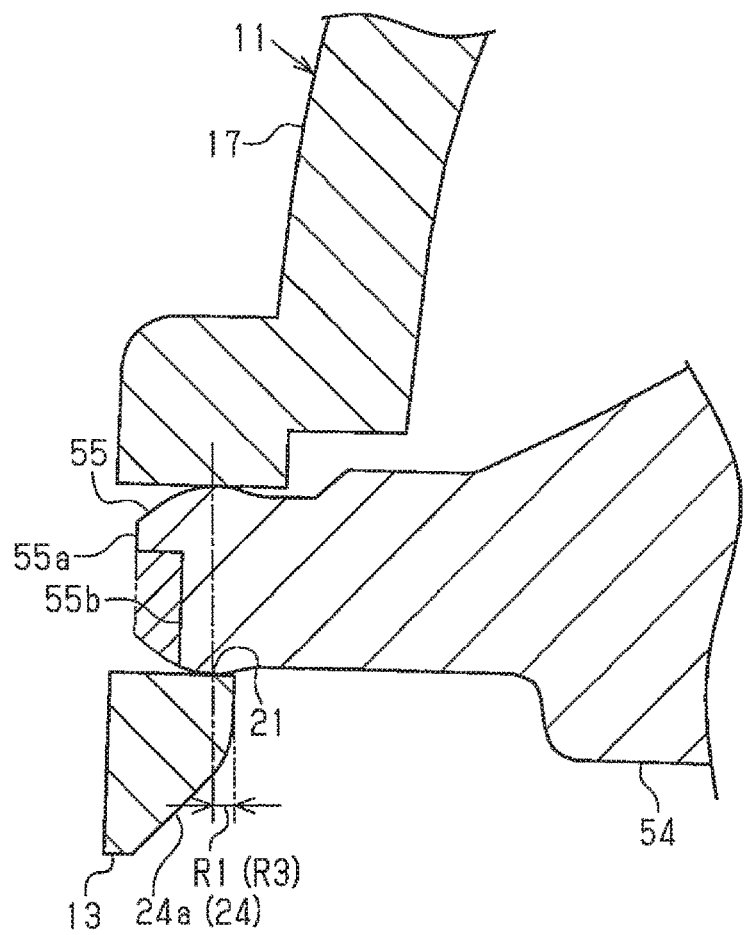
FIG. 4B is an enlarged cross-sectional view of a part of FIG. 4A.
Figure 5B:
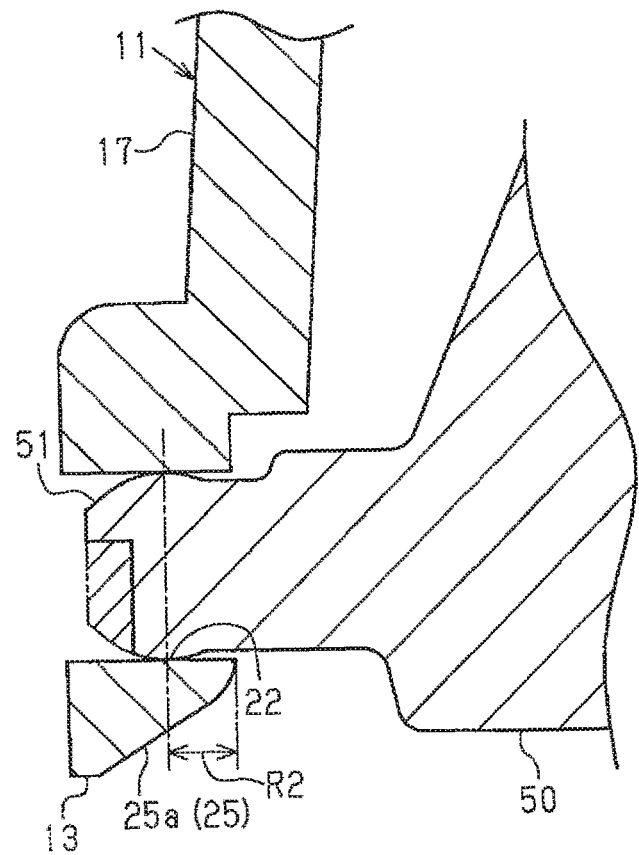
FIG. 5B is an enlarged cross-sectional view of a part of FIG. 5A.

As shown in FIGS. 4B and 5B, the overlap R1 between the rotation shaft 55 of the upper sub-fin 54 and the inner surface defining the first bearing hole 21 is smaller than the overlap R2 between the rotation shaft 51 of the main fin 50 and the inner surface defining the second bearing hole 22 (R2>R1). The overlap R3 between the rotation shaft 58 of the lower sub-fin 57 and the inner surface defining the third bearing hole 23 is equal to the overlap R1 of the upper sub-fin 54 (R3=R1, see FIG. 4B).

<Gates G for Injection Molding of Downstream Fins 50, 54 and 57>

For example, to fabricate the upper sub-fin 54 by injection molding, a gate G for injecting molten plastic into the mold may be set at the end surface of the rotation shaft 55 that is to be inserted into the first bearing hole 21 of the retainer 11. In this case, the following problem may occur. That is, if the gate G is set at the entire end surface of the rotation shaft 55, the plastic molding often leaves a projection, or a gate vestige, on the entire end surface. This gate vestige is pressed onto the area around the first bearing hole 21 of the retainer 11 when the rotation shaft 55 is coupled to the first bearing hole 21 from the downstream side along the extension direction of the retainer 11. This may damage the area around the first bearing hole 21 and lower the product quality.

As shown in FIG. 7, the end surface of the rotation shaft 55 of the present embodiment is step-shaped and includes an upstream section 55a and a downstream section 55b, which is located inward of the upstream section 55a in the vehicle width direction. A gate G is set only at the downstream section 55b. FIG. 7 shows a gate vestige 55c, which is surrounded by a dashed double-dotted line and the downstream section 55b and indicated by the hatch lines with narrower distance. In the present embodiment, the height of the step between the downstream section 55b and the upstream section 55a is slightly greater than the length of the gate vestige 55c.

In the present embodiment, the rotation shafts 51 and 58 of the main fin 50 and the lower sub-fin 57 that are inserted in the second bearing hole 22 and the third bearing hole 23 of the retainer 11 have a similar shape as the rotation shaft 55 that is inserted in the first bearing hole 21.

The operation of the present embodiment is now described.

In the retainer 11, which substantially has the shape of a rectangular tube, a section of each vertical wall 17 that is closer to the center in the up-down direction is easier to bend, whereas a section of the vertical wall 17 that is farther from the center is more difficult to bend.

Handling of the operation knob 70 results in that the main fin 50 is pulled more often than the sub-fins 54 and 57 and with a greater force. The main fin 50 is therefore required to withstand a greater pulling force than the sub-fins 54 and 57.

In the present embodiment, the overlaps R1 and R3 in the axial direction between the rotation shafts 55 and 58 of the sub-fins 54 and 57, which are free of the operation knob 70, and the inner surfaces defining the bearing holes 21 and 23 are smaller than the overlap R2 in the axial direction between the rotation shaft 51 of the main fin 50, to which the operation knob 70 is mounted, and the inner surface defining the bearing hole 22. The main fin 50, to which the operation knob 70 is mounted, has a larger overlap than the sub-fins 54 and 57 (R2>R1=R3) and is thus able to withstand a greater pulling force. Since the section of the vertical wall 17 of the retainer 11 that includes the second bearing hole 22 easily bends, the larger overlap is unlikely to adversely affect the assembly.

As for the sub-fins 54 and 57, to which the operation knob 70 is not mounted, although the sections of the vertical wall 17 of the retainer 11 that include the first bearing hole 21 and the third bearing hole 23 are more difficult to bend, the sub-fins 54 and 57 have smaller overlaps than the main fin 50, to which the operation knob 70 is mounted. This limits adverse effects to the assembly. In addition, the pulling force the sub-fins 54 and 57 need to withstand is smaller than that for the main fin 50, so that the smaller overlap is unlikely to result in the sub-fins 54 and 57 failing to withstand the pulling force.

The advantages of the air-conditioning register of the present embodiment are now described.

(1) The overlaps R1 and R3 between the rotation shafts 55 and 58 of the sub-fins 54 and 57 and the inner surfaces defining the bearing holes 21 and 23 are smaller than the overlap R2 between the rotation shaft 51 of the main fin 50 and the inner surface defining the bearing hole 22 (R2>R1=R3).

This structure, which has the advantage described above, allows the downstream fins 50, 54 and 57 to be coupled appropriately along the extension direction of the retainer 11.

The coupling of the downstream fins 50, 54 and 57 is unlikely to deform the bearing holes 21, 22 and 23 of the retainer 11. This prevents the operation load required for tilting the downstream fins 50, 54 and 57 from becoming excessively large. As such, the operation feeling is not degraded.

(2) Sections of the inner surface of the vertical wall 17 of the retainer 11 that are downstream of the bearing holes 21, 22 and 23 include inclined surfaces 24a, 25a and 26a, which are inclined inward from the downstream end surface 13 to the bearing holes 21, 22 and 23.

With this structure, to insert the rotation shafts 51, 55 and 58 of the downstream fins 50, 54 and 57 into the bearing holes 21, 22 and 23, the rotation shafts 51, 55 and 58 are pressed onto the inclined surfaces 24a, 25a and 26a of the retainer 11 from the downstream side, causing the vertical wall 17 to flexibly deform outward in a gentle manner. That is, the inclined surfaces 24a, 25a and 26a guide the coupling of the rotation shafts 51, 55 and 58 of the downstream fins 50, 54 and 57 to the bearing holes 21, 22 and 23 of the retainer 11. This achieves smooth coupling of the downstream fins 50, 54 and 57 to the retainer 11.

(3) The end surface of the rotation shaft 55 is step-shaped so that the downstream section 55b of the end surface is located inward of the upstream section 55a in the vehicle width direction.

When a gate G is set at the downstream section 55b of the end surface of the rotation shaft 55, the gate vestige 55c, which results from plastic molding, is unlikely to extend outward beyond the upstream section 55a in the vehicle width direction. Thus, when the rotation shaft 55 is coupled to the first bearing hole 21 of the retainer 11 from the downstream side along the extension direction of the retainer 11, the area around the first bearing hole 21 of the retainer 11 is pressed by the upstream section 55a, which has a smooth surface, and is unlikely to be pressed by the gate vestige 55c. This helps to prevent damage.

(4) The first shim 30, which supports the rotation shafts 51, 55 and 58, is located only on one side of the downstream fins 50, 54 and 57.

This structure uses fewer components than a structure in which shims are placed on both sides of the downstream fins 50, 54 and 57, thereby simplifying the structure of the air-conditioning register 10 and reducing the manufacturing costs.

<Modifications>

The embodiment described above may be modified as follows.

Figure 8:
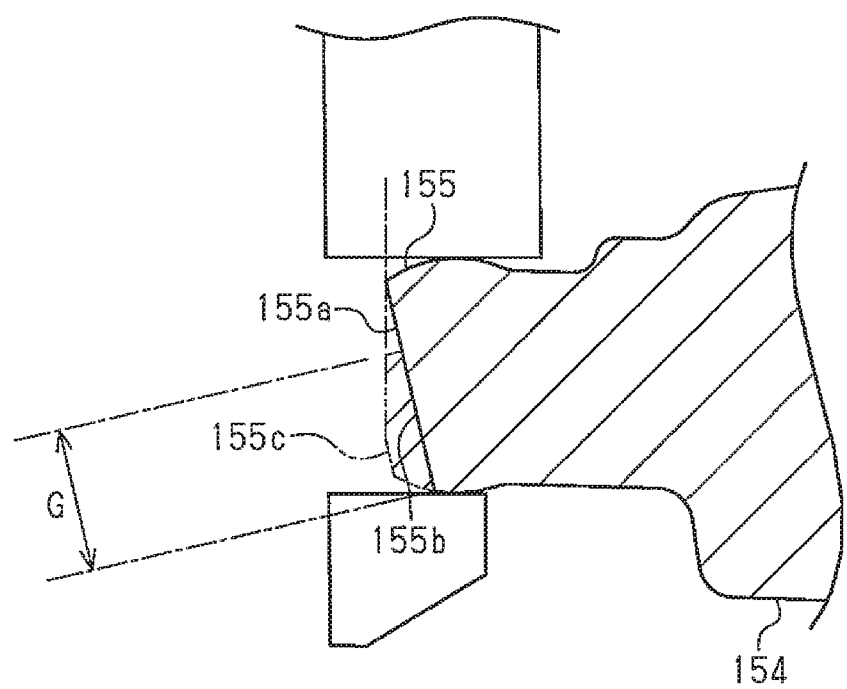
FIG. 8 is an enlarged cross-sectional view of a rotation shaft of a downstream fin of a modified embodiment.

As shown in FIG. 8, the entire end surface of a rotation shaft 155 of an upper sub-fin 154 may be an inclined surface that is inclined such that the upstream side is located outward in the vehicle width direction. In this case, a gate G is set only at the downstream section 155b of the end surface of the rotation shaft 155, which is located inward in the vehicle width direction of the upstream section 155a, This structure achieves an advantage equivalent to advantage (3) of the embodiment described above. The same modification is applicable to the main fin and other sub-fins.

All or some of the inclined surfaces 24a, 25a and 26a in the downstream end surface 13 of the vertical wall 17 of the retainer 11 may be omitted.

The present examples and embodiments are to be considered as illustrative and not restrictive and the invention is not to be limited to the details given herein, but may be modified within the scope and equivalence of the appended claims.

The invention claimed is:

1. An air-conditioning register comprising:
a tubular retainer defining an air passage and including a wall and a downstream opening;
a plurality of fins located adjacent to the downstream opening in the retainer, the fins being arranged parallel to one another and tiltable relative to the retainer; and
an operation knob mounted to one of the fins that is located at a center in an arrangement direction of the plurality of fins, wherein
each of the fins includes two rotation shafts located at opposite ends of the fin and each rotation shaft has a bulge,
the wall of the retainer includes a plurality of bearing holes, each bearing hole defining an inner circumferential surface in contact with the bulge so that each bearing hole supports one of the rotation shafts of a corresponding one of the fins, and
an overlap between the rotation shaft of one of the fins that is free of the operation knob and the inner circumferential surface of a corresponding one of the bearing holes is smaller than an overlap between the rotation shaft of the fin to which the operation knob is mounted and the inner circumferential surface of a corresponding one of the bearing holes, wherein the overlap is defined as a distance in an axial direction of the rotation shaft from an inner surface of the wall of the retainer to a contact point between the bulge of the rotation shaft and the inner circumferential surface of the bearing hole.

2. The air-conditioning register according to claim 1, wherein a section of an inner surface of the wall of the retainer that is downstream of each of the bearing holes includes an inclined surface, which is inclined inward from a downstream end surface of the wall to the bearing hole.

3. The air-conditioning register according to claim 1, wherein the rotation shaft has an end surface including an upstream section and a downstream section located inward of the upstream section in the axial direction, wherein a gate for injection molding is set only at the downstream section during injection molding of the fin.

4. The air-conditioning register according to claim 2, wherein the rotation shaft has an end surface including an upstream section and a downstream section located inward of the upstream section in the axial direction, wherein a gate for injection molding is set only at the downstream section during injection molding of the fin.

\* \* \* \* \*